US008555484B2

(12) United States Patent
Yokoo et al.

(10) Patent No.: US 8,555,484 B2
(45) Date of Patent: Oct. 15, 2013

(54) METHOD OF MANUFACTURING A YOKE OF A ROTATING ELECTRIC MACHINE

(75) Inventors: Tsugio Yokoo, Isesaki (JP); Keiichi Hosoi, Isesaki (JP)

(73) Assignee: Mitsuba Corporation, Kiryu-shi (JP)

( * ) Notice: Subject to any disclaimer, the term of this patent is extended or adjusted under 35 U.S.C. 154(b) by 884 days.

(21) Appl. No.: 12/659,621

(22) Filed: Mar. 15, 2010

(65) Prior Publication Data
US 2010/0186218 A1 Jul. 29, 2010

Related U.S. Application Data

(62) Division of application No. 11/920,431, filed as application No. PCT/JP2006/309564 on May 12, 2006, now abandoned.

(30) Foreign Application Priority Data

May 16, 2005 (JP) .................................. 2005-142148

(51) Int. Cl.
*H02K 15/00* (2006.01)
(52) U.S. Cl.
USPC .............................................. 29/596; 29/598
(58) Field of Classification Search
USPC .......... 29/596, 598, 732; 310/40 MM, 79, 81, 310/89, 90, 91, 154.08, 272
See application file for complete search history.

(56) References Cited

U.S. PATENT DOCUMENTS

| 5,763,974 | A |  | 6/1998 | Vacca |
|---|---|---|---|---|
| 6,104,109 | A | * | 8/2000 | Sato ........................ 310/40 MM |
| 6,342,739 | B1 |  | 1/2002 | Furuya et al. |
| 6,465,927 | B2 |  | 10/2002 | Shiraki et al. |
| 6,608,410 | B2 |  | 8/2003 | Sato et al. |
| 6,853,104 | B2 |  | 2/2005 | Shiraki et al. |

FOREIGN PATENT DOCUMENTS

| JP | A 02-202332 | 8/1990 |
|---|---|---|
| JP | A 08-149742 | 6/1996 |
| JP | A 2003-032956 | 1/2003 |

OTHER PUBLICATIONS

International Search Report mailed Jul. 18, 2006 for PCT/JP2006/309564.

* cited by examiner

*Primary Examiner* — Thiem Phan
(74) *Attorney, Agent, or Firm* — Oliff & Berridge, PLC

(57) ABSTRACT

A method for manufacturing a yoke includes forming a through-hole that is open in a yoke bottom surface and a cylindrical bearing support portion by burring an edge of the through-hole using a burring punch, wherein the burring punch is located on a base end side at a distance from a cylinder front-end portion of the bearing support portion so as to form a ring-shaped flange portion inclined toward an inner radial side on the cylinder front-end portion of the bearing support portion.

5 Claims, 7 Drawing Sheets

METHOD OF MANUFACTURING A YOKE OF A ROTATING ELECTRIC MACHINE

CROSS-REFERENCE TO RELATED APPLICATIONS

This application is a Division of application Ser. No. 11/920,431 filed Nov. 15, 2007, which in turn is the U.S. National Stage of PCT/JP2006/309564, filed May 12, 2006, which claims priority from JP2005-142148, filed May 16, 2005, the entire disclosures of which are incorporated herein by reference hereto.

BACKGROUND

The present disclosure relates to a manufacturing method of a yoke.

There exists an electric motor as an example of a rotating electric machine. The electric motor, for example, is constructed such that its motor shaft that corresponds to a rotating shaft is sometimes supported by, and penetrates through, a yoke bottom surface. In the yoke bottom surface, a throughhole is opened. A cylindrical bearing support portion for housing a bearing is formed at a part where the through-hole is formed. When the bearing is housed in the bearing support portion, however, the bearing will be displaced in the axial direction of the motor shaft because the bearing support portion has been formed into a cylindrical shape and there is no part to support the bearing.

In order to solve this problem, on a cylinder front-end portion of the bearing support portion, claw portions are formed so as to be located at a plurality of positions in the circumferential direction. The claw portions thus support one end portion of the bearing and prevents the bearing from coming off (see Japanese Published Unexamined Patent Application No. H08-149742, for example).

SUMMARY

However, in the conventional art as described above, because the claw portions are formed on the cylinder frontend portion of the bearing support portion, a cylindrical bearing support portion first needs to be formed. After that, on a front edge of the bearing support portion, a plurality of claw portions need to be formed by cutting using a cutting process. Then, the claw portions need to be bent so as to be formed toward the inner radial side using a bending process. This process has various disadvantages because the number of operation processes is increased, the operation is complicated, and the costs are increased. In addition, the roundness of the bearing support portion may be impaired in the course of these processes to be conducted. The present disclosure solves these problems as well as other problems and is also able to achieve various advantages.

The disclosure addresses an exemplary aspect, wherein an rotating electric machine includes a bearing; a rotating shaft supported via the bearing; and a yoke with a bearing support portion formed on a yoke bottom surface. The bearing support portion houses the bearing. On a cylinder front-end portion of the bearing support portion, integrally formed is a ringshaped flange portion that is inclined toward an inner radial side so as to prevent the bearing from coming off one end side.

In another exemplary aspect, the bearing support portion is formed by burring an edge of a through-hole opened in the yoke bottom surface by use of a burring punch. The flange portion is formed by locating, at the time of burring, a front end portion of the burring punch on a base end side at a distance from the cylinder front-end portion of the bearing support portion.

In another exemplary aspect, a step portion formed on the rotating shaft prevents the bearing from coming off another end side.

In another exemplary aspect, a shield ring attached to the yoke bottom surface prevents the bearing from coming off another end side.

In another exemplary aspect, a method for manufacturing a yoke includes the step of forming a through-hole that is open in a yoke bottom surface and a cylindrical bearing support portion by burring an edge of the through-hole using a burring punch. The burring punch is located on a base end side at a distance from a cylinder front-end portion of the bearing support portion so as to form a ring-shaped flange portion inclined toward an inner radial side on the cylinder front-end portion of the bearing support portion.

According to various exemplary aspects of the disclosure, the bearing is reliably prevented from coming off, and a highly reliable yoke can be provided.

According to various exemplary aspects of the disclosure, the flange portion can be formed integrally when the bearing support portion is being burred. A yoke can thus be provided with a bearing support portion whose roundness can be accurately secured. The number of operation processes also can be reduced in order to raise productivity and contribute to a reduction in cost.

According to various exemplary aspects of the disclosure, coming off of the bearing can reliably be avoided, and thus a further improvement in reliability can be realized.

BRIEF DESCRIPTION OF THE DRAWINGS

Various embodiments of the disclosure will be described with reference to the drawings, wherein.

DETAILED DESCRIPTION OF EMBODIMENTS

Figure 1:
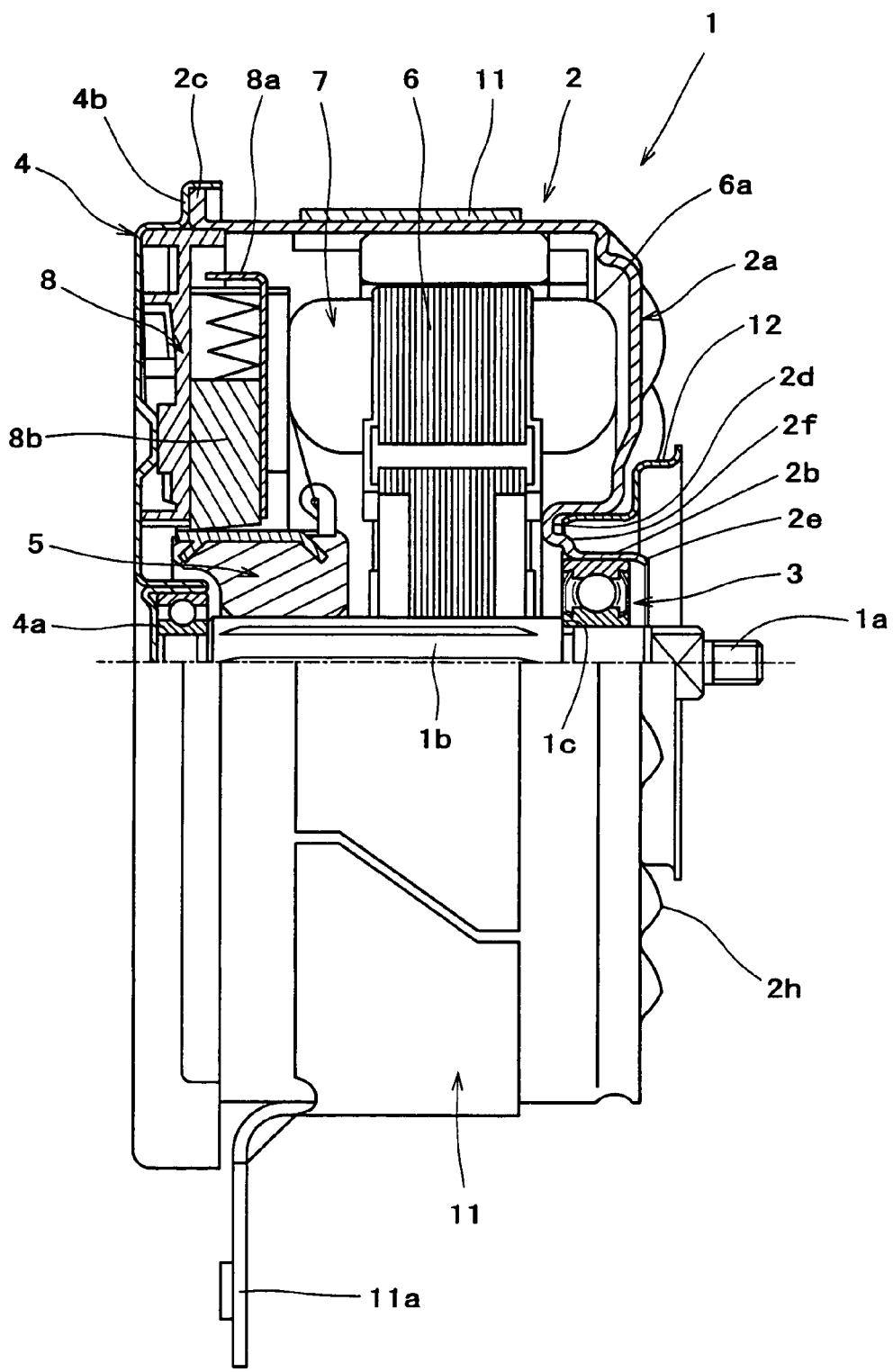
FIG. 1 is a partially sectional side view of an electric motor.

Next, embodiments of the present disclosure will be described based on the drawings. In FIG. 1, reference numeral 1 denotes an electric motor (a rotating electric machine) that functions as a fan motor. One end of a motor shaft 1a of the electric motor 1, as will be described later, is supported on a yoke 2 via a bearing 3 that is internally fitted to a bearing support portion 2b that is formed on a bottom portion 2a of the yoke 2 having a cylindrical shape with a bottom. The end of the motor shaft 1a that is supported via the bearing 3 is disposed so as to protrude outward from the yoke bottom portion 2a.

The other end of the motor shaft 1a is supported via a bearing 4a on an end bracket 4 that covers an opening end of the yoke 2 (see FIG. 1). On the protruded front end portion (one end) that is protruded outward from the yoke bottom portion 2a of the motor shaft 1a, integrally provided is an unillustrated fan (not illustrated), which is set to integrally rotate with a rotation of the motor shaft 1a.

The motor shaft 1a is integrally externally fitted with a commutator 5, which is located on the end bracket 4 side (see FIG. 1). A plurality of iron cores 6 are externally fitted to the motor shaft 1a on the yoke bottom portion 2a side further than the commutator 5. A plurality of coils 6a are wound around the outer circumferences of these iron cores 6, and a rotor 7 is constructed.

A striking portion 2c is formed at the opening end of the yoke 2 in a manner enlarged to the outer radial side (see FIG. 1). Against the striking portion 2c, struck is a striking portion 4b that is formed on an outer radial rim portion of the end bracket 4. In a part where these striking portions 2c and 4b are struck against each other, a flat ring-shaped outer radial rim portion 8a of a brush holder stay 8 is provided in a positioned manner.

In the brush holder stay 8, brush holders that include the radial rim portion 8a are provided at four positions in the circumferential direction, respectively. In these respective brush holders, housed are brushes 8b whose front ends slidably contact with an outer circumferential surface of the commutator 5. These respective brushes 8b are connected to external power via pigtails (not shown), whereby the external power is supplied to the commutator 5 via the pigtails and brushes 8b.

The respective coils 6a of the rotor 7 are electrically connected to the commutator 5 (see FIG. 1). These coils 6a are set to be energized by being supplied with the external power via the pigtails, brushes 8b, and commutator 5. The rotor 7 is set to rotate in response to a magnetic field that is formed by a permanent magnet 9 fixedly attached to an inner circumferential surface of the yoke 2. These basic constructions are the same as in the conventional art.

Also, the electric motor 1 of the present embodiment is constructed so as to be attached in a state where, as shown in FIG. 1, the motor shaft 1 faces in the left and right direction and the end bracket 4 stands.

For the yoke bottom portion 2a, a recess is provided toward the cylinder inside, and a concave portion 2d is formed in a ring shape (see FIG. 1). An inner radial-side lateral piece of the concave portion 2d forms the bearing support portion 2b. The bearing support portion 2b is formed such that its cylinder front-end portion faces the yoke bottom portion 2a side (one-end side of the motor shaft 1a). The bearing 3 is fitted therewith. On the cylinder front-end portion of the bearing support portion 2b, formed is a ring-shaped flange portion 2e that is inclined to the inner radial side. The flange portion 2e is set to restrict the bearing 3 from coming off to the one-end side.

Also, in the present embodiment, it is set so that the bearing 3 fitted with the bearing support portion 2b is prevented from coming off to the other-end side with an other-end portion of the bearing 3 being struck against a step portion 1c that is formed between a large diameter portion 1b that is formed on the outer circumference of the motor shaft 1a and a one-end portion.

Figure 4A:
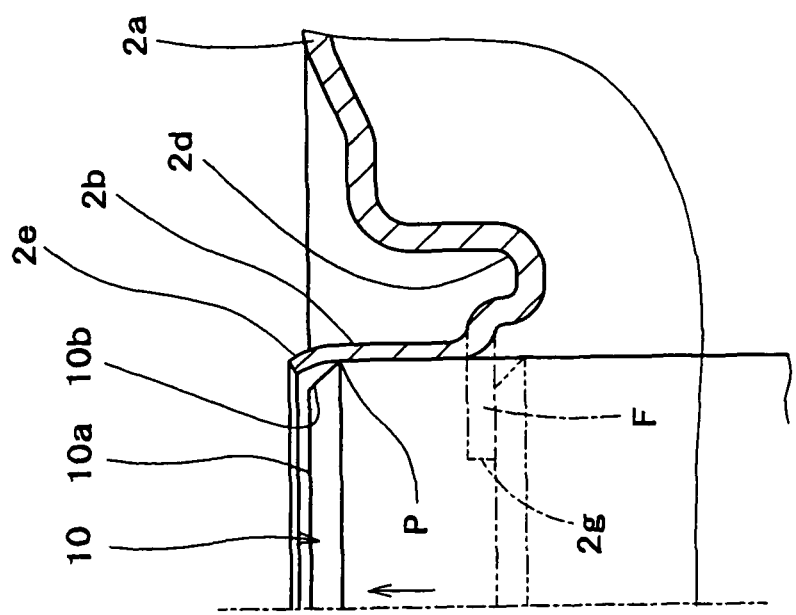
FIG. 4A is a main-part enlarged sectional view of a yoke.
Figure 4B:
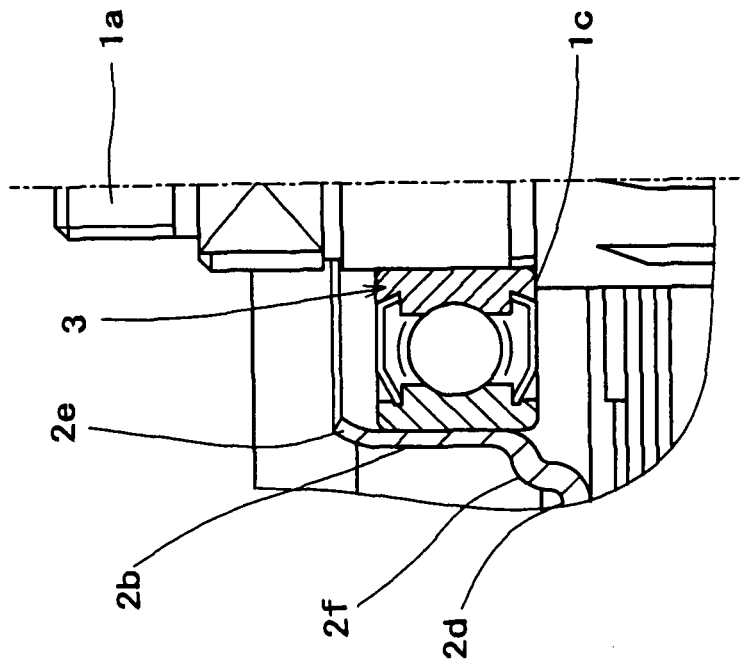
FIG. 4B is the yoke incorporated with a bearing and a motor shaft.

A description will not be provided that explains how the flange portion 2e on the cylinder front-end portion of the bearing support portion 2b is formed. For the yoke bottom portion 2a, a step portion 2f is shaped at the inner radial-side lateral piece of the ring-shaped concave portion 2d (see FIG. 4B). On the inner radial side of the step portion 2f, as shown by an alternate long and short dashed line of FIG. 4A, a groove bottom piece F to form the concave portion 2d is shaped in a pre-formed state. The groove bottom piece F has a through-hole 2g open at the center. A portion of the groove bottom piece F with the through-hole 2g open is set to correspond to an inner diameter-side lateral piece of the concave portion 2d, that is, a part where the bearing support portion 2b is formed.

During a burring process, a cylinder front-end face 10a of a columnar burring punch 10 is struck from the inside of the yoke 2 against the groove bottom piece F that corresponds to a hole edge of the through-hole 2g, and the burring punch 10 is pushed out toward the yoke bottom portion 2a side. The groove bottom piece F thus is shaped into the bearing support portion 2b by the burring.

Here, the burring punch 10 is formed so as to have the same outside diameter in size as the inside diameter of the bearing support portion 2b. The cylinder front-end face 10a of the burring punch 10 of the present embodiment has a chamfered portion 10b that is formed at the outer circumference. The outside diameter of the burring punch 10 at the cylinder front-end face 10a is thus smaller than the inside diameter of the bearing support portion 2b.

The burring process being conducted, an extruding motion of the burring punch 10 is completed such that a base end-side part of the chamfered portion 10b of the burring punch 10, that is, where an outside diameter is the same as the inside diameter of the bearing support portion 2b, the front end side part P, is located on the base end side at a distance from the cylinder front-end portion of the bearing support portion 2b. Accordingly the cylinder front-end portion of the bearing support portion 2b is shaped into a ring shape and inclined to the inner diameter side. This part thus serves as the flange portion 2e of the present disclosure, and also functions as to prevent the bearing 3 form coming off.

Figure 2A:
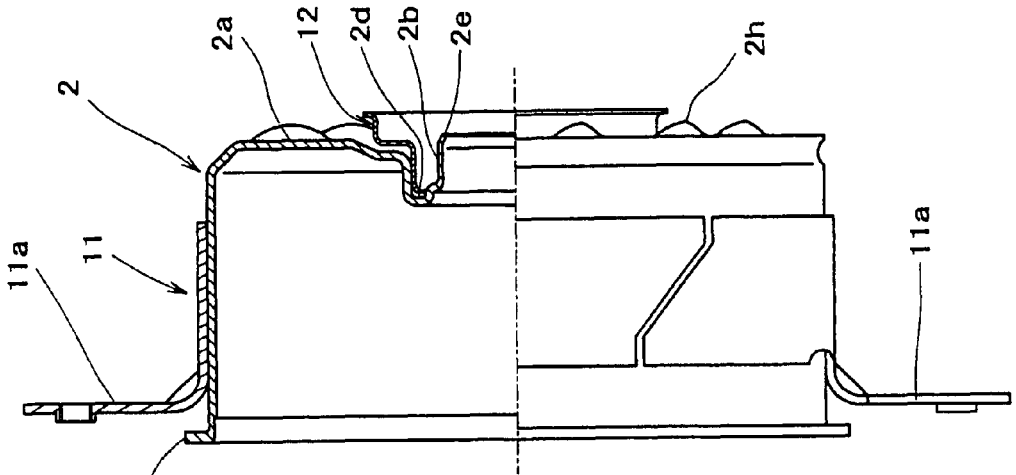
FIG. 2A is a front view.
Figure 2B:
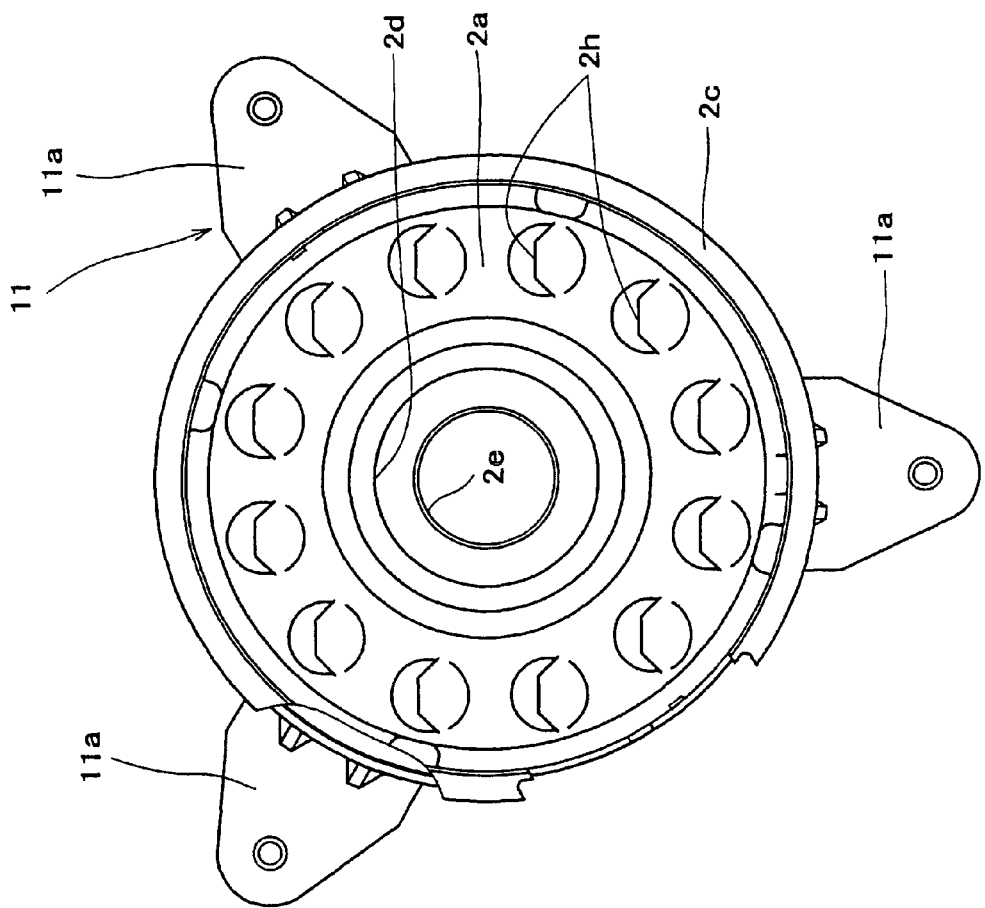
FIG. 2B is a partially sectional side view of a yoke.
Figure 3:
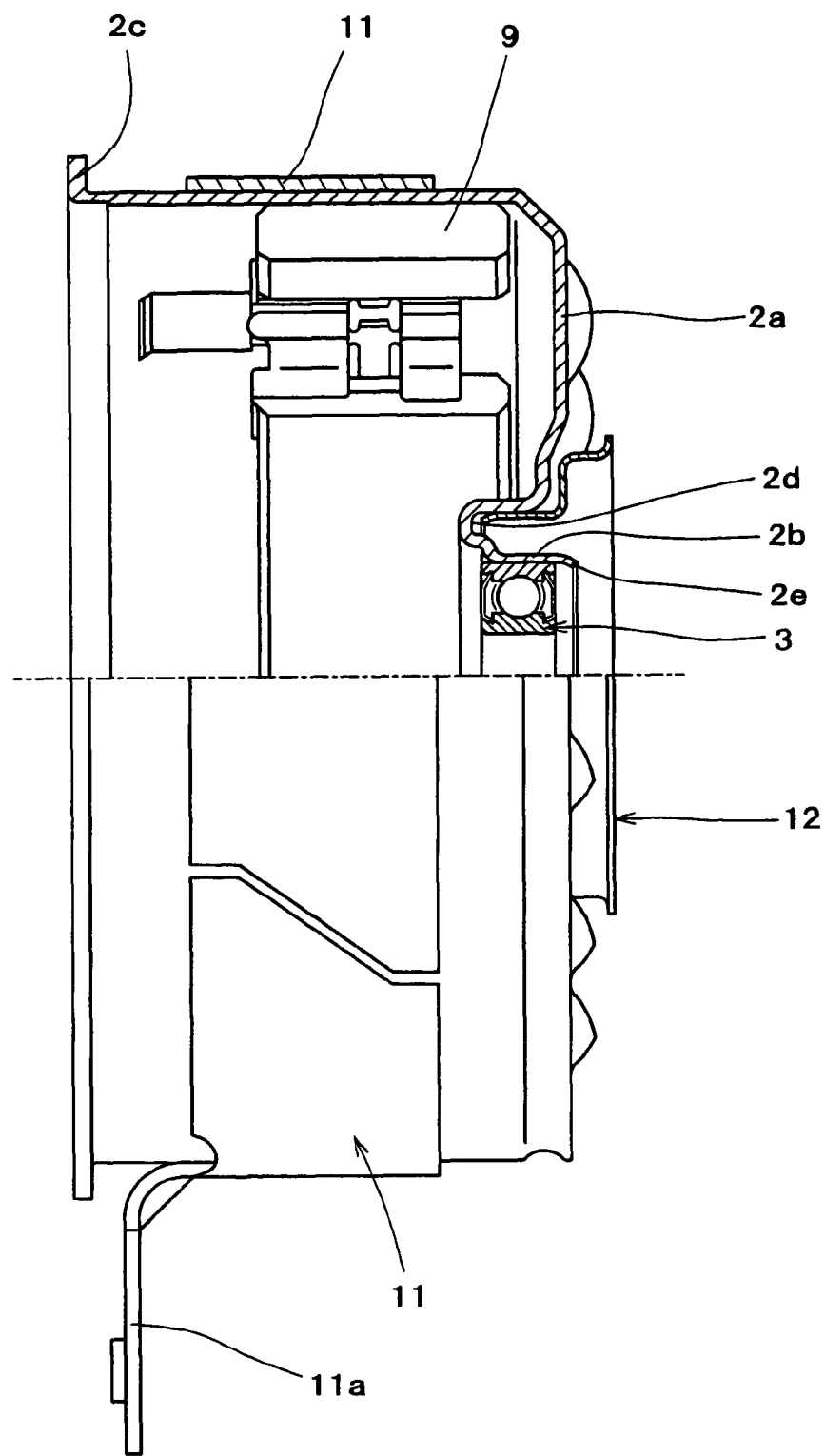
FIG. 3 is a partially sectional side view of a yoke incorporated with a bearing.

In FIG. 1, 2A, and 2B, reference numeral 2h denotes vent holes open in a plurality of locations in the yoke bottom portion 2a. Reference numeral 11 denotes a bracket used for attaching the electric motor 1. For this bracket 11, a plurality of attachment pieces 11a are formed in the outer radial direction from a cylindrical body portion that is externally fitted to the outer circumference of the yoke 2 (see FIGS. 2A and 2B). Reference numeral 12 denotes a shield ring that is fitted and attached to the concave portion 2d of the yoke bottom portion 2a. Because of the shield ring 12, the interior of the yoke 2 including the motor shaft 1a is watertight (see FIG. 1, FIG. 2B, and 3).

In the present embodiment constructed as described above, with regard to the electric motor 1, the rotor 7 that is integrated with the motor shaft 1a rotates as external power is supplied. At this time, the bearing 3 that freely and rotatably supports one end of the motor shaft 1a is housed in the bearing support portion 2b that is formed on the yoke bottom portion 2a. And the ring-shaped flange portion 2e that is inclined to the inner radial side is formed at the cylinder front-end portion of the bearing support portion 2b. The flange portion 2e, therefore, prevents the bearing 3 from coming off to the one-end side, which enables the bearing 3 to reliably avoid coming off from the yoke 2.

In this case, while the bearing support portion 2b is being shaped by a burring process, the flange portion 2e is formed, not by extruding the burring punch 10 until it reaches a state penetrating through the bearing support portion 2b, but by extruding the front end-side part P of the burring punch 10 up to a position to be on the base end side further than the cylinder front end of the bearing support portion 2b. As a result, there is no such problems as seen in the conventional art where the bearing support portion is formed, the member for preventing the bearing from coming off is formed by separate shaping, and disadvantageously the number of operation processes is increased to cause complication. With the present structure being adopted, not only is it easy to secure roundness of the bearing support portion 2b, but also roundness of the bearing support portion 2b can be secured with accuracy. Therefore, a low-cost and highly reliable yoke 2 can be formed with outstanding productivity.

With regard to the bearing 3 of the present embodiment, the step portion 1c of the motor shaft 1a is struck against the other end face of the bearing 3. Because of this, the bearing 3 coming off from the yoke 2 can be reliably avoided with its one-end side being prevented from coming off by the flange portion 2e. The other-end side is also prevented from coming off by the motor shaft step portion 1c. Therefore, further improvements in reliability can be realized. And since it is not necessary to separately provide a member for preventing the bearing 3 from coming off, a reduction in the number of components can also be accomplished; thus, a further reduction in cost can be expected.

Figure 5:
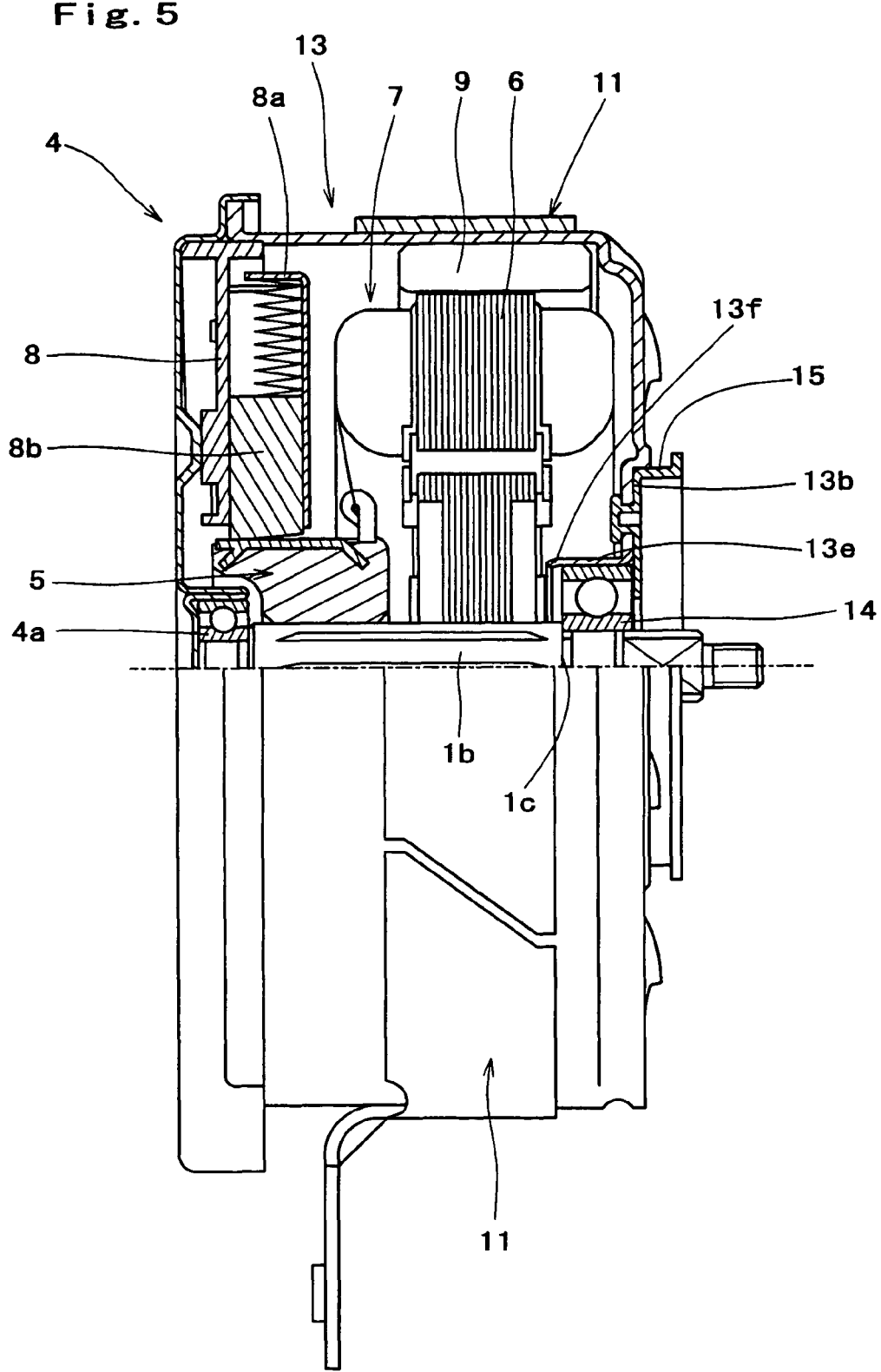
FIG. 5 is a partially sectional side view of an electric motor of a second embodiment.

As a matter of course, the present disclosure is not limited to the aforementioned embodiment. It is also possible to carry out the present disclosure in a second embodiment shown in FIG. 5 to FIG. 7. The second embodiment has the same basic constructions as does the aforementioned embodiment except that the yoke 13 has a different shape. A detailed description thereof will be omitted by using the same reference numerals as those of the first embodiment.

Figure 6:
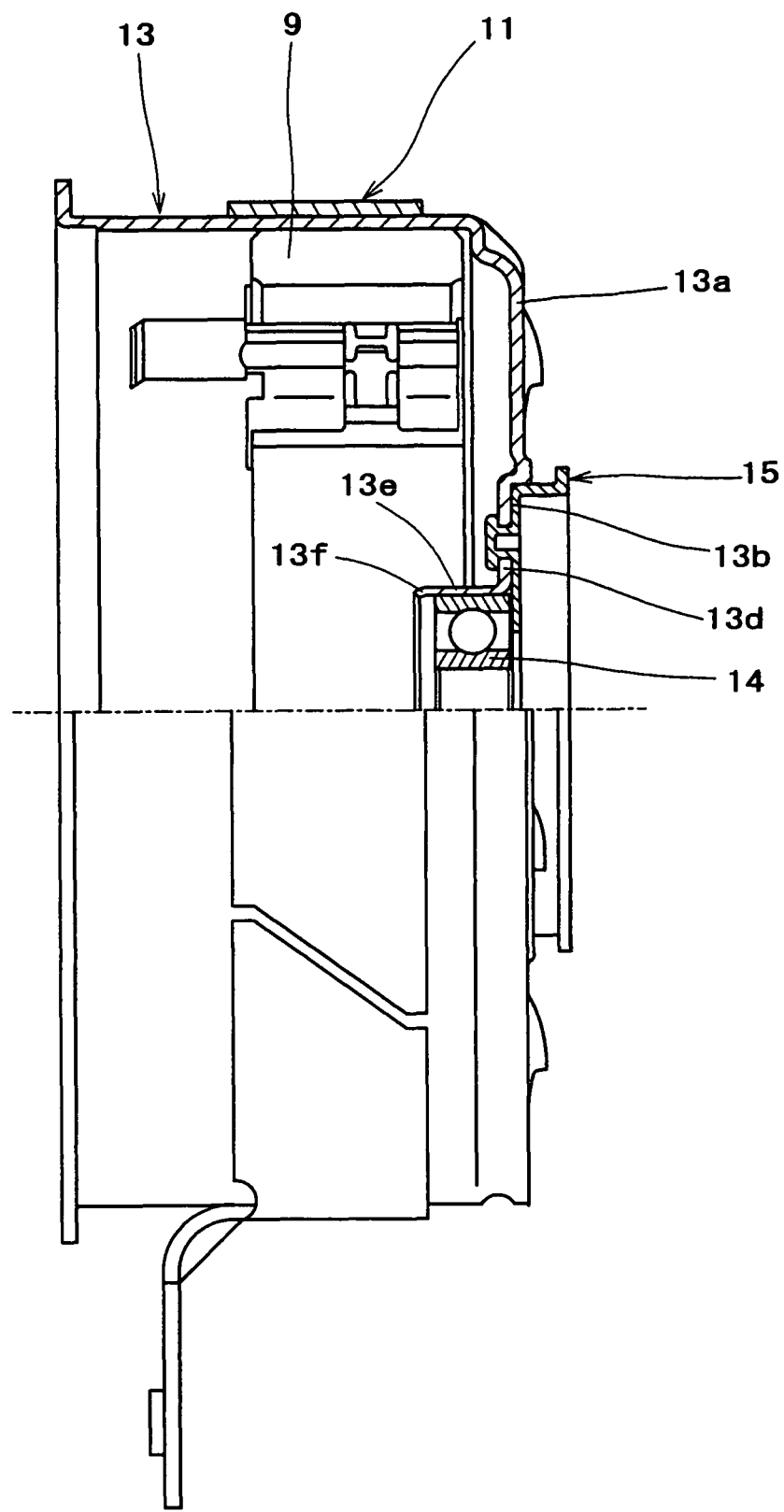
FIG. 6 is a partially sectional side view of a yoke incorporated with a bearing of the second embodiment.
Figure 7A:
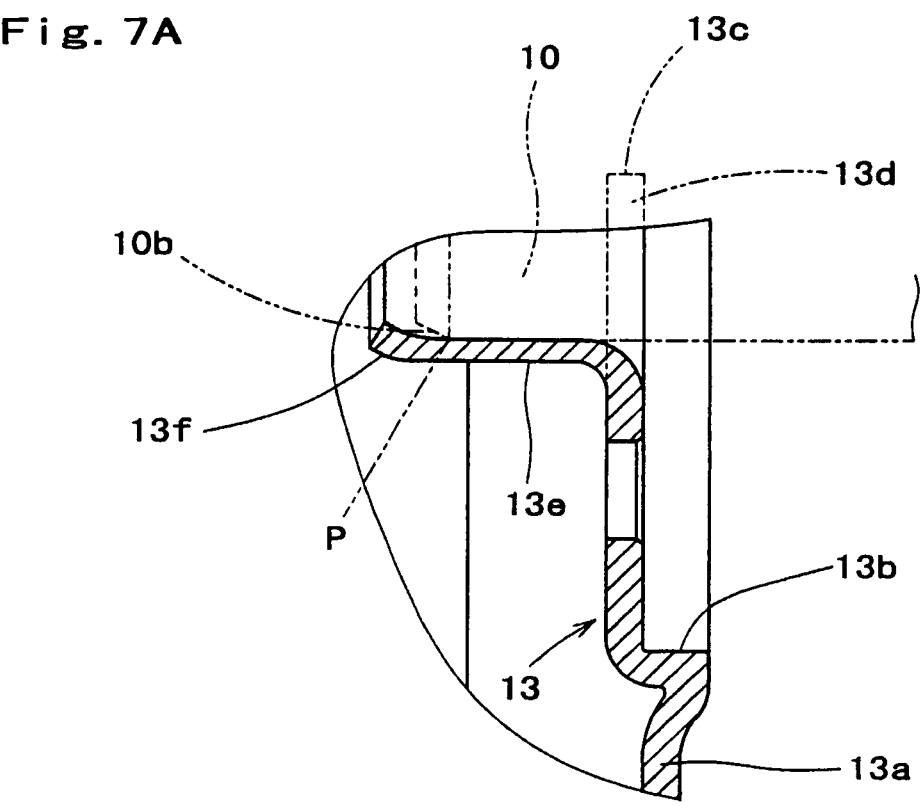
FIG. 7A is a main-part enlarged sectional view of a yoke.
Figure 7B:
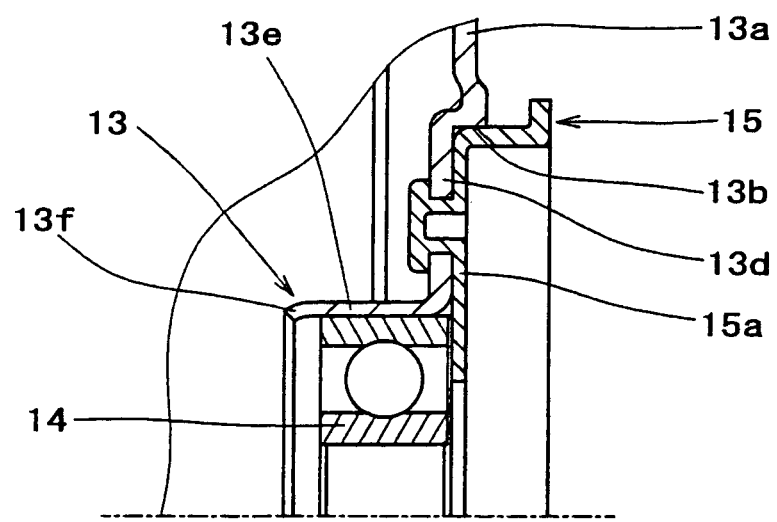
FIG. 7B is the yoke incorporated with a bearing and a motor shaft of the second embodiment.

For the yoke 13 of the second embodiment, on its bottom portion 13a, a shallow groove-shaped concave portion 13b to which a shield ring 15 is attached by fitting is formed in a ring shape in a recessed state to the inside of the yoke cylinder (see FIG. 6). A bearing support portion 13e is formed by burring a groove bottom piece 13d (a hole edge of a through-hole 13c) with a through-hole of the concave portion 13b toward the inside of the yoke 13. The bearing support portion 13e of the present embodiment is formed so that its cylinder front-end portion is located on the other-end side of a motor shaft 1a. There formed is a ring-shaped flange portion 13f inclined to the inner radial side. And thereby a bearing 14 to be housed in the bearing support portion 13e is set and is prevented by the flange portion 13f from coming off to the other-end side. Furthermore, the bearing 14 is set to be prevented from coming off by being struck against a bottom surface 15a of the shield ring 15 provided in the concave portion 13b of the yoke bottom portion 13a.

With regard to the flange portion 13f of the second embodiment, when a burring process is applied to the groove bottom piece 13d of the yoke bottom portion 13a by use of the burring punch 10, an extruding motion of the burring punch 10 is completed as a part P that is the most front end side of the part of the burring punch 10, where an outside diameter is the same as the inside diameter of the bearing support portion 13e, reaches a base end side further than the cylinder front-end portion of the bearing support portion 13e. Accordingly, the cylinder front-end portion of the bearing support portion 13e is shaped so as to be inclined to the inner diameter side. This part serves as the flange portion 13f of the present disclosure.

As for preventing the bearing 14 from coming off on the other-end side in the present embodiment, a coming-off prevention is provided by a step portion 1c of the motor shaft 1a as well as the flange portion 13f of the bearing support portion 13e.

And therein as well, since the flange portion 13f can be formed simultaneously at the stage of forming the bearing support portion 13e by burring, the number of operation processes can be reduced so that the cost can be reduced. Moreover, a high roundness of the bearing support portion 13e can be obtained, whereby an electric motor that is high in reliability can be provided.

The present disclosure is useful for a yoke of a rotating electric machine, such as an electric motor, and for a manufacturing method of the yoke. Because a flange portion also can be formed at a front end in the process of forming a cylindrical bearing support portion to support a motor shaft on a yoke bottom surface, it is not necessary to perform a cutting and a bending process. Thus, the operation can be simplified, the cost can be reduced, and a bearing support portion with high roundness can be formed.

What is claims:

1. A method for manufacturing a yoke, comprising:
   forming a through-hole that is open in a yoke bottom surface of the yoke so as to penetrate a rotating shaft therein and a cylindrical bearing support portion by burring an edge of the through-hole with a burring punch that extrudes from inside of the yoke toward a yoke bottom side; and
   forming a ring-shaped flange portion inclined toward an inner radial side on a cylinder front-end portion of the bearing support portion by finishing extruding of the burring punch when a front-end side part of the burring punch is located on a base end side at a distance from the cylinder front-end portion of the bearing support portion.

2. The method according to claim 1, further comprising the step of:
   fitting a bearing into the bearing support portion such that the ring-shaped flange portion prevents the bearing from coming off toward a cylinder front-end side of the bearing support portion.

3. The method according to claim 2, further comprising the step of:
   forming a step portion on the rotating shaft to prevent the bearing from coming off toward the base end side of the bearing support portion.

4. A method for manufacturing a yoke, comprising:
   forming a through-hole that is open in a yoke bottom surface of the yoke so as to penetrate a rotating shaft therein and a cylindrical bearing support portion by burring an edge of the through-hole with a burring punch that extrudes from a yoke bottom side toward an inside of the yoke; and
   forming a ring-shaped flange portion inclined toward an inner radial side on a cylinder front-end portion of the bearing support portion by finishing extruding of the burring punch when a front-end side part of the burring punch is located on a base end side at a distance from the cylinder front-end portion of the bearing support portion.

5. The method according to claim 4, further comprising the step of:
   attaching a shield ring to the yoke bottom surface to prevent a bearing from coming off toward the base end side of a bearing support portion.

* * * * *